United States Patent
Margiott

(10) Patent No.: US 6,365,291 B1
(45) Date of Patent: Apr. 2, 2002

(54) DIRECT ANTIFREEZE SOLUTION CONCENTRATION CONTROL SYSTEM FOR A FUEL CELL POWER PLANT

(75) Inventor: Paul R. Margiott, Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/543,210

(22) Filed: Apr. 5, 2000

(51) Int. Cl.$^7$ ............................................... H02M 8/04
(52) U.S. Cl. ............................ 429/25; 429/26; 429/34
(58) Field of Search ............................... 429/25, 26, 34

(56) References Cited

U.S. PATENT DOCUMENTS

| | | | |
|---|---|---|---|
| 3,801,372 A | * | 4/1974 | Shaw |
| 4,080,487 A | * | 3/1978 | Reiser ........................ 429/26 X |
| 4,824,740 A | * | 4/1989 | Abrams et al. ............ 429/26 X |
| 4,835,072 A | * | 5/1989 | Grasso et al. ............. 429/26 X |
| 5,700,595 A | | 12/1997 | Reiser |
| 5,998,058 A | | 12/1999 | Fredley |
| 6,007,931 A | | 12/1999 | Fuller et al. |
| 6,013,385 A | * | 1/2000 | DuBose ..................... 429/26 X |
| 6,207,308 B1 | * | 3/2001 | Grasso et al. .................. 429/26 |
| 6,242,118 B1 | * | 6/2001 | Grasso et al. ............. 429/26 X |

* cited by examiner

Primary Examiner—Stephen Kalafut
(74) Attorney, Agent, or Firm—Malcolm J Chisholm, Jr.

(57) ABSTRACT

The invention is a direct antifreeze solution concentration control system for a fuel cell power plant that controls a concentration of a direct antifreeze within a direct antifreeze solution cooling fluid within the plant. The concentration control system includes at least one fuel cell; a thermal management system that controls a temperature within the fuel cell including a porous water transport plate secured in direct fluid communication with a cathode catalyst of the fuel cell, wherein the direct antifreeze solution passes through the water transport plate; a water recovery device in fluid communication with a process exhaust stream exiting the fuel cell for recovering water from the process exhaust stream; and, a process exhaust by-pass line in fluid communication between the fuel cell and a plant exhaust vent that selectively directs some or all of the process exhaust stream to by-pass the water recovery device and to pass out of the plant through the plant exhaust vent. Whenever water recovery by the water recovery device exceeds a specified maximum rate, the process exhaust by-pass line directs the process exhaust to by-pass the water recovery device and thereby restrict dilution of the direct antifreeze solution. The concentration control system may also include a boiler in fluid communication with the thermal management system that boils the direct antifreeze solution to produce steam for selectively directing steam out of the power plant through a steam exhaust vent.

24 Claims, 2 Drawing Sheets

DIRECT ANTIFREEZE SOLUTION CONCENTRATION CONTROL SYSTEM FOR A FUEL CELL POWER PLANT

TECHNICAL FIELD

The present invention relates to fuel cells that are suited for usage in transportation vehicles, portable power plants, or as stationary power plants, and the invention especially relates to a fuel cell power plant that utilizes an antifreeze solution passing through components of the power plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate or support layer to form an anode electrode adjacent the first surface of the PEM, and securing a second catalyst layer between a second surface of the PEM opposed to the first surface and a second or cathode porous substrate or support layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell as a liquid through a porous water transport plate, or by evaporation or entrainment into a gaseous stream of either the process oxidant or reducing fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations. Use of such fuel cells to power a transportation vehicle gives rise to additional problems associated with water management, such as preventing the product water from freezing, and rapidly melting any frozen water during start up whenever the fuel-cell powered vehicle is operated in sub-freezing conditions.

Known fuel cells typically utilize an open or closed thermal management or coolant system supplying a flow of cooling fluid through a porous or sealed cooler plate within the fuel cell to maintain the cell within an optimal temperature range. Where the cooling fluid is a solution including water it also must be kept from freezing. It is known to utilize a conventional antifreeze solution such as ethylene glycol and water or propylene glycol and water as a cooling fluid in such a closed coolant system having a sealed cooler plate. However, such antifreeze solutions are not acceptable in an open coolant system because they are known to be adsorbed by and poison the catalysts that form electrodes. Furthermore, those antifreeze solutions have low surface tensions which result in the solutions wetting any porous, wetproofed support layers adjacent cell catalysts, thereby impeding diffusion of reactant fluids through the support layers to the catalysts, which further decreases performance of the electrodes. Also, the vapor pressure of such conventional antifreezes is high, resulting in excessive loss rates of the antifreeze solutions through fuel cell exhaust streams.

A fuel cell power plant includes a fuel cell or fuel cell stack to generate electricity and a variety of systems to support the fuel cell stack. For example, if the plant is to be utilized to power a transportation vehicle, it is necessary that the power plant be self-sufficient in water to be viable. Self-sufficiency in water means that enough water must be retained within the plant to offset losses from reactant fluids exiting the plant in order to efficiently operate the plant. Any water exiting the plant through a plant process exhaust stream consisting of a cathode exhaust stream of gaseous oxidant and/or an anode exhaust stream of fluid exiting the anode side of the fuel cell or a burner exhaust stream must be balanced by water produced electrochemically at the cathode electrode and water retained within the plant. To maintain water self-sufficiency, it is common that the plant include a water recovery device, controls, and piping to recover and direct water into the fuel cell stack to maintain proper wetting of the PEM electrolytes, and humidity of the reactant streams, etc.

Additionally, it is known that some fuel cell power plants operate on pure hydrogen gas, while others utilize a reformate wherein a hydrogen enriched reducing fluid is formed from any of a variety of hydrocarbon fuels by fuel processing components including for example use of steam mixed with the fuel at high temperatures within a reformer, as is well known in the art. If a fuel cell power plant included a steam generator for such fuel processing components, as with the water recovery device, the water in such components would have to be protected against freezing, such as by use of an antifreeze solution.

Water retention by the recovery devices of such fuel cell power plants will vary depending upon power output of the plant. For example, the water recovery device may be a condenser positioned to pass a process exhaust stream exiting the fuel cell in heat exchange relationship with a cooling fluid to condense and recover water within the process exhaust stream. When the power output of the plant is low, more water will be recovered by the condenser than when the power output is high. If the water recover ed by the condenser is mixed with an antifreeze to prevent freezing and then directed to power plant components, an excess recovery rate of the water may so dilute the antifreeze within the water management system and other power plant components that the water may freeze. Another problem with excess water recovery is that the dilute d antifreeze may overflow from the system resulting in a loss of antifreeze.

Accordingly, there is a need to control a concentration of antifreeze within the fuel cell power plant so that an antifreeze solution passing through the plant is maintained within a proper antifreeze concentration range.

DISCLOSURE OF THE INVENTION

A direct antifreeze solution concentration control system for a fuel cell power plant is disclosed for controlling a concentration of a direct antifreeze within a direct antifreeze solution cooling fluid passing through the plant. The control system includes at least one fuel cell for generating electricity from reducing fluid and process oxidant reactant streams having an electrolyte secured between an anode and cathode catalyst; a thermal management system that controls a temperature within the fuel cell including a porous water transport plate secured in direct fluid communication with the cathode catalyst that receives water adjacent the cathode catalyst during generation of electricity, wherein the direct antifreeze solution passes through the water transport plate; a water recovery device in fluid communication with a process exhaust stream exiting the fuel cell within a plant exhaust line and in fluid communication with a cooling fluid for recovering water from the process exhaust stream and for distributing the recovered water within the power plant; a direct antifreeze reservoir in fluid communication with the thermal management system for selectively supplying the direct antifreeze to the direct antifreeze solution passing through the porous water transport plate; and, a process exhaust by-pass line in fluid communication between the fuel cell and a plant exhaust vent that selectively directs some or all of the process exhaust stream to by-pass the water recovery device and to pass out of the plant through the plant exhaust vent.

In alternative embodiments of the direct antifreeze concentration control system, the water recovery device may be a direct mass and heat transfer device that directs the process exhaust stream exiting the fuel cell to pass within the device in mass transfer relationship with the process oxidant stream entering the plant so that water vapor and heat within the process exhaust stream pass directly through a mass transfer medium means of the device into the oxidant stream entering the fuel cell. In such an embodiment during a period of excess water recovery, the process exhaust by-pass line may selectively direct some or all of the process exhaust to avoid the direct mass and heat transfer device and pass out of the plant through the plant exhaust vent, thereby reducing an amount of water retained within the plant. Additionally or alternatively, the concentration control system may include an oxidant mass-transfer device by-pass line that selectively directs some or all of the process oxidant stream to by-pass the mass and heat transfer device prior to entering the fuel cell to also reduce the amount of water recovered and retained within the power plant through the process oxidant stream entering the plant.

In another embodiment, the water recovery device may be a condenser water recovery device that directs the process exhaust stream to pass in heat exchange relationship with a condenser cooling fluid, wherein the condenser cooling fluid also passes through a heat rejection apparatus and flow control valve for controlling a temperature of the condenser cooling fluid within the condenser. In a further embodiment, the concentration control system may include a boiler in fluid communication with the thermal management system that boils the direct antifreeze solution to produce steam in fluid communication with a steam separator and steam exhaust valve and vent for selectively directing steam out of the power plant through the steam exhaust vent.

Because the porous water transport plate of the thermal management system is in direct fluid communication with the cathode catalyst of the fuel cell so that there is no barrier to liquid or vapor flow between the water transport plate and the cathode catalyst, it is necessary to utilize a direct antifreeze solution because ordinary ethylene glycol and water or propylene glycol and water types of antifreeze solutions would move from the water transport plate to contact and poison the cathode catalyst. The direct antifreeze solution is an organic antifreeze solution that is not volatile at cell operating temperatures, such as glycerol. For purposes herein, "non-volatile" is defined to mean that the antifreeze solution sustains a loss of less than 10% of its antifreeze for every 500 operating hours of the fuel cell at fuel cell operating temperatures.

In operation of the direct antifreeze solution concentration control system for a fuel cell power plant, water passing through the electrolyte from the anode catalyst, water generated at the cathode catalyst, and water within the process oxidant stream passing by the cathode catalyst may move directly into the porous water transport plate, and hence into the thermal management system. Water vapor may also move from the cathode catalyst to the water transport plate or into the oxidant stream passing by the cathode, to be recovered within the water recovery device. Water recovered by the water recovery device also moves into the thermal management system directly through the mass and heat transfer water recovery device into process oxidant stream entering the fuel cell and then into the water transport plate, or indirectly through water moving from the condenser into the boiler and then into a steam injection line for selectively injecting steam into the reactant streams entering the fuel cell to humidify the reactant streams. The thermal management system and water recovery device are therefore in direct or indirect fluid communication. Consequently, an increase in water recovered by the water recovery device would dilute a concentration of direct antifreeze within the direct antifreeze solution in the thermal management system, and could also lead to diluted antifreeze overflowing from the plant leading to loss of the antifreeze. The increased water and diluted antifreeze could also result in an ice build-up in the power plant, especially during a shut down period in a sub-freezing environment, thereby requiring a pre-start up melting system and deleterious delay in usage of the fuel cell power plant. Such an ice build up could also result in mechanical damage to various components of the plant.

When a control sensor, such as a viscosity sensor, senses a dilution of the direct antifreeze within the direct antifreeze solution within the power plant, the concentration control system may control the process exhaust by-pass line to direct some or all of the process exhaust stream to by-pass the water recovery device. Additionally, if the water recovery device is a direct mass and heat transfer device, the concentration control system may control the oxidant mass transfer by-pass line to direct some or all of the process oxidant stream entering the fuel cell to by-pass the mass and heat transfer device, to thereby decrease the water vapor in the process oxidant stream, resulting in less water entering the thermal management system through the porous water transport plate, which results in an increase in the relative proportion of direct antifreeze in the direct antifreeze solution within the thermal management system.

If the water recovery device is a condenser, then the concentration control system may control the heat rejection apparatus or condenser cooling fluid flow control valve to increase the temperature and/or decrease the flow rate of the condenser cooling fluid passing through the condenser to thereby decrease a rate of condensation of water in the process exhaust stream passing through the condenser. That causes more water to be removed from the plant within the process exhaust stream passing through the plant exhaust vent. Similarly, if the plant includes a boiler, steam separator and steam exhaust valve and vent, the concentration control system may control the steam vent to direct steam to be vented out of the power plant. The steam separator may also be controlled to send some of the direct antifreeze separated from the steam back to the thermal management system to increase the concentration of direct antifreeze in the direct antifreeze solution within the thermal management system. If the sensor senses the concentration of direct antifreeze descending below a specific level, the concentration control system also controls the direct antifreeze reservoir to send some of the direct antifreeze from the reservoir into the thermal management system, to thereby increase the concentration of direct antifreeze within the direct antifreeze cooling fluid passing through the fuel cell and other power plant components.

Accordingly it is a general object of the present invention to provide a direct antifreeze solution concentration control system for a fuel cell power plant that overcomes deficiencies of the prior art.

It is a more specific object to provide a direct antifreeze solution concentration control system for a fuel cell power plant that minimizes dilution of direct antifreeze within a direct antifreeze solution cooing fluid within the plant.

It is yet another object to provide a direct antifreeze solution concentration control system for a fuel cell power plant that increases a concentration of direct antifreeze within the direct antifreeze solution cooling fluid whenever the concentration of direct antifreeze decreases below a minimum desired concentration.

It is another object to provide a direct antifreeze solution concentration control system for a fuel cell power plant that controls a concentration of direct antifreeze within a direct antifreeze solution cooling fluid within all components of the power plant.

It is a further specific object to provide a direct antifreeze solution concentration control system for a fuel cell power plant that controls a concentration of direct antifreeze within a direct antifreeze solution cooling fluid in direct fluid communication with an anode or cathode catalyst of the fuel cell without poisoning the catalysts.

These and other objects and advantages of the present direct antifreeze concentration control system for a fuel cell power plant will become more readily apparent when the following description is read in conjunction with the accompanying drawings.

DESCRIPTION OF THE PREFERRED EMBODIMENTS

Figure 1:
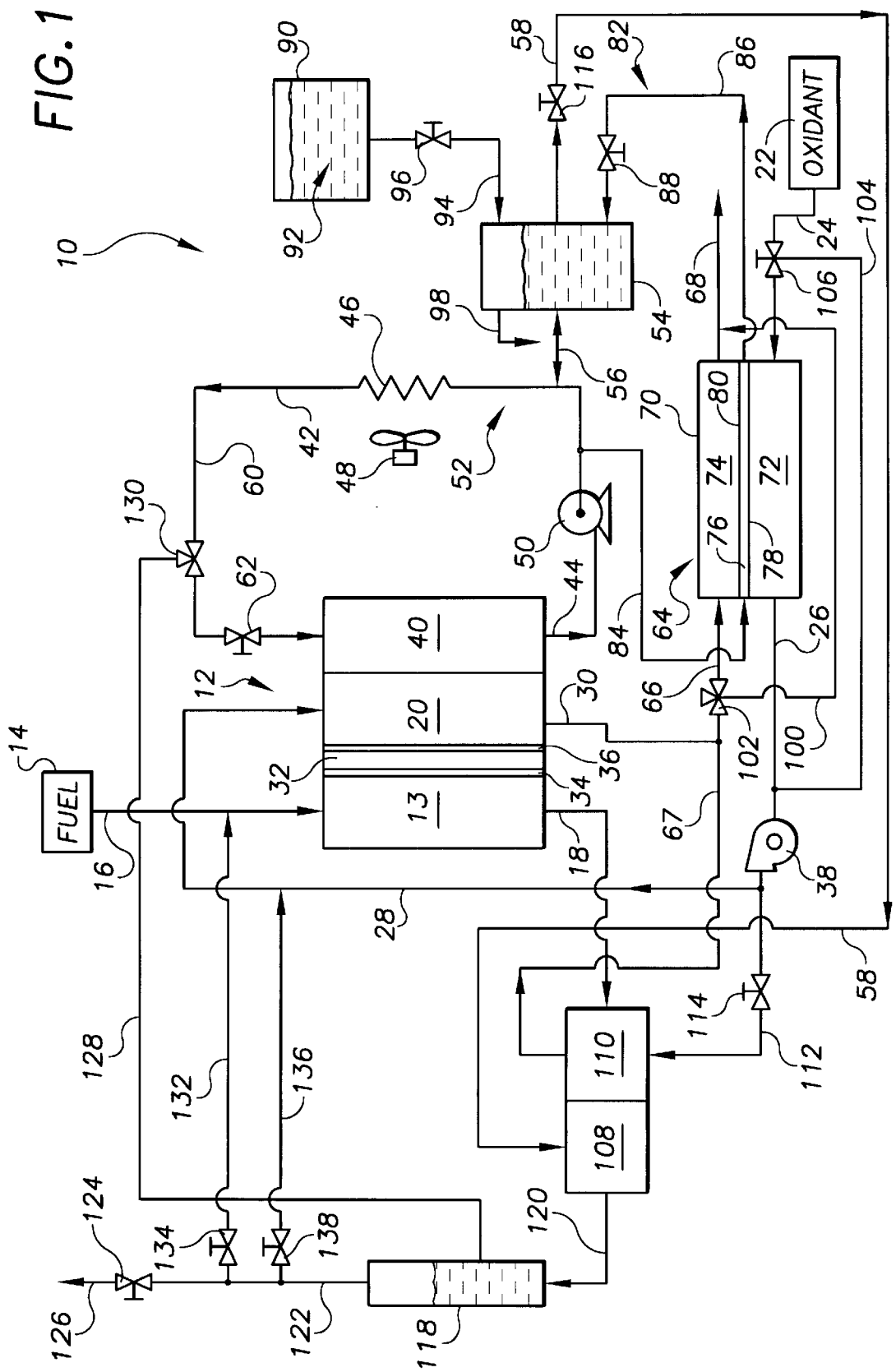
FIG. 1 is a schematic representation of a first embodiment of a direct antifreeze solution concentration control system for a fuel cell power plant constructed in accordance with the present invention, wherein a water recovery device is a mass and heat transfer water recovery device.

Referring to the drawings in detail, a first embodiment of a direct antifreeze solution concentration control system for a fuel cell power plant of the present invention is shown in FIG. 1, and is generally designated by the reference numeral 10. The direct antifreeze concentration control system 10 includes at least one fuel cell means for generating electricity, such as a fuel cell 12 shown in FIG. 1. The fuel cell 12 includes an anode flow field 13 that receives a reducing fluid directed from a fuel supply component 14 through a fuel inlet 16 to flow through the anode flow field 13 and leave the cell 12 through an anode exhaust line 18. The cell 12 also includes a cathode flow field 20 that receives a process oxidant stream directed from an oxidant supply component 22 through an oxidant inlet 24, a first oxidant inlet extension 26 and second oxidant inlet extension 28 to flow through the cathode flow field 20 and out of the cell 12 through a cathode exhaust line 30. The fuel cell 12 also includes an electrolyte 32 such as a proton exchange membrane ("PEM") secured between the anode and cathode flow fields 13, 20. An anode electrode including an anode catalyst 34 is secured between the anode flow field 13 and the electrolyte 32, and a cathode electrode including a cathode catalyst 36 is secured between the cathode flow field 20 and the electrolyte 32. The anode catalyst 34, electrolyte 32 and cathode catalyst 34 may be secured together in a well known manner to form a "membrane electrode assembly", and the fuel cell 12 may include substrate and support layers (not shown) assembled in a manner well known in the art, such as described in U.S. Pat. No. 5,998,058 that issued to R. Fredley on Dec. 7, 1999, which patent is owned by the assignee of all rights in the direct antifreeze concentration control system described herein, which patent is incorporated herein by reference.

An oxidant blower 38 may be positioned on the oxidant passage 24, such as on the first extension 26 thereof, to variably flow the gaseous oxidant stream into the fuel cell 12. It is stressed, however, that preferably such a blower only increases operating pressures of the process oxidant stream to a range of from atmospheric pressure to about 1.0–2.0 pounds per square inch above atmospheric pressure, or from about 14.7 to about 16.7 pounds per square inch atmospheric (hereafter "PSIA").

A porous water transport plate 40 is secured adjacent the cathode flow field 20 so that the water transport plate is in direct fluid communication with the cathode catalyst 36. For purposes herein, the phrase "being in direct fluid communication with the cathode catalyst" means that there is no physical barrier to liquid or gaseous flow between the water transport plate 40 and the cathode catalyst 36. A direct antifreeze solution cooling fluid is directed through a coolant feed line 42 into the porous water transport plate 40 adjacent the cathode flow field 20, and out of the water transport plate 40 in a coolant return line 44. The coolant feed line 42 and coolant return line 44 may be in fluid communication with a coolant heat exchanger 46 to cool the cooling fluid, such as a radiator type of heat exchanger common to automobiles that may have a coolant fan 48 adjacent the coolant heat exchanger to pass a cooling fluid such as ambient air over the coolant heat exchanger 46. A coolant pump 50 may be secured between the coolant return line 44 and the coolant feed line 42 to pump the cooling fluid into and through the water transport plate 40, coolant return line 44, and coolant heat exchanger 46. When the coolant feed line 42, water transport plate 40, coolant return line 44 and coolant heat exchanger 46 are in fluid communication as shown schematically in FIG. 1, those components may be characterized as a coolant loop 52 having a direct antifreeze solution circulating through the water transport plate 40 and circulating through the coolant loop 42. Alternatively, the coolant feed line 42 may direct the cooling fluid to pass through the water transport plate 40 without cycling through the coolant loop 40.

A direct antifreeze solution accumulator means 54 for accumulating liquid cooling fluid may also receive some of the cooling fluid and product water formed within the fuel cell 12 and flowing through the water transport plate 40, coolant return line 44 and an accumulator supply line 56. The cooling fluid accumulator means 54 may be a well-known accumulator for storing any excess accumulated direct antifreeze solution cooling fluid and fuel cell product water generated by the fuel cell 12 due to changes in operating conditions. The accumulator may also direct the stored direct antifreeze solution through an accumulator discharge line 58 to other components of the fuel cell power plant 10 described below.

The water transport plate 40, coolant feed and return lines 42, 44, coolant heat exchanger 46 and fan 50, coolant pump 50, and the cooling fluid accumulator 54 and supply line 56 to the coolant loop 52 may be characterized as the primary components of a thermal management system means for controlling a temperature within the fuel cell by passing a direct antifreeze solution cooling fluid through the porous water transport plate 40.

The direct antifreeze solution may be any organic antifreeze solution that is essentially non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures. Alternatively, a first preferred direct antifreeze solution may be a special direct antifreeze solution having the following characteristics: 1. a freezing point of at least −20 degrees Fahrenheit (hereafter "°F."); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred direct antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

The direct antifreeze concentration control system 10 may also include a pressure control means in fluid communication with the water transport plate 40 for maintaining a positive pressure differential between the process oxidant and reducing fluid reactant streams passing through the fuel cell 12 within the anode and cathode flow fields 12, 20 and the direct antifreeze solution passing through the cell 12 within the water transport plate 40. The pressure control means may include the coolant pump 50 coordinated with a pressure control valve means for maintaining a specific pressure of the direct antifreeze solution within a coolant feed line extension 60 down stream of the valve means, water transport plate 40 and coolant return line 44, such as pressure control valve 62 secured between the coolant feed line extension 60 and coolant feed line 42 downstream from the coolant pump 50 and the water transport plate 40. As is well-known, the pressure control valve 62 may be set manually, automatically, or, for example, may be electromechanically adjusted based upon a reference pressure within the reducing fluid and or process oxidant streams within the anode and/or cathode flow fields 13, 20 to restrict flow through the valve 62 so that the stream of direct antifreeze solution drawn into the coolant pump 50 from the coolant feed line extension 60, water transport plate 40 and coolant return line 44 is at a pressure lower than the pressure of the reactant streams within the anode and/or cathode flow fields 13, 20. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the thermal management system means may be manufactured of standard materials well-known in the art such as heat exchangers common to automobile technology, and piping and valving well-known in the chemical process industry, etc.

The direct antifreeze concentration control system for a fuel cell power plant 10 also includes a water recovery device means in fluid communication with a process exhaust stream exiting the fuel cell 12 for recovering water exiting the plant within the process exhaust stream. In the first embodiment of the concentration control system 10 shown schematically in FIG. 1, the water recovery device means is a direct mass and heat transfer device 64 secured in fluid communication with both the oxidant inlet 24 and a plant exhaust line 66 that receives the cathode exhaust stream from the cathode exhaust line 30 and that may also receive an anode exhaust stream from the anode exhaust line 18 directly, or indirectly through a combusted anode exhaust line 67, as shown in FIG. 1. The process exhaust stream may be either all or a portion of the cathode exhaust stream, all or a portion of the anode exhaust stream, or all or a portion of combined anode and cathode exhaust streams. The plant exhaust line 66 directs the process exhaust stream into the mass and heat transfer device 64 and a plant exhaust vent 68 directs the plant exhaust stream out of the device 64 and out of the concentration control system 10. The oxidant inlet 24 directs the process oxidant stream from the oxidant supply 22 as a cooling fluid into the direct mass and heat transfer device 64, and the first and second extensions 26, 28 of the oxidant inlet 26 direct the process oxidant stream from the direct mass and heat transfer device 64 to the fuel cell 12.

The mass and heat transfer device 64 includes a separator housing or structure 70 that defines an oxidant chamber 72 through which the process oxidant stream passes, and an exhaust chamber 74 through which the process exhaust stream passes. The structure 70 also secures a mass transfer medium means for sorbing a fluid substance consisting of polar molecules within the plant exhaust stream and for desorbing the fluid substance consisting of polar molecules into the process oxidant stream. The structure 70 may be a separator housing means for supporting the mass transfer medium means in mass transfer relationship with the process exhaust stream and process oxidant stream so that both streams contact opposed surfaces of the mass transfer medium means, and for preventing bulk mixing of the plant exhaust and process oxidant streams. An exemplary mass transfer medium means includes a fine pore enthalpy exchange barrier 76 secured in mass transfer relationship between the oxidant and exhaust chambers 72, 74 so that the process oxidant stream within the oxidant chamber 72 passes adjacent an inlet surface 78 of the barrier and the process exhaust stream within the exhaust chamber 74 passes adjacent an exhaust surface 80, and the structure 70 secures the fine pore enthalpy exchange barrier 76 as a barrier between the oxidant and exhaust streams (shown schematically in FIG. 1) to prevent bulk mixing of the streams.

The mass and heat transfer device means may also include a liquid transfer medium supply means for supplying a liquid transfer medium to the fine pore enthalpy exchange barrier 76, such as a transfer medium circulating loop 82 that supplies a portion of the direct antifreeze solution to the fine pore enthalpy exchange barrier 108. The transfer medium circulating loop 82 may include a liquid transfer medium feed line 84 secured between the enthalpy exchange barrier 76 and the thermal management system, such as at the coolant feed line 42 downstream from the coolant pump; a liquid transfer medium return line 86 secured between the barrier 76 and the thermal management system for example at the direct antifreeze solution accumulator 54; and a liquid transfer control valve means 88 secured along the liquid transfer medium return line 86 for selectively cycling a portion of the direct antifreeze solution through the fine pore enthalpy exchange barrier 76.

In operation of the direct mass and heat transfer device 64, as the process exhaust stream passes through the exhaust chamber 74, water vapor from the fuel cell 12 is sorbed by the liquid transfer medium within the fine pore enthalpy exchange barrier 76 and desorbed from the liquid transfer medium into the process oxidant stream within the oxidant chamber 72, thereby adding heat to, and humidifying the process oxidant stream before it enters the cathode flow field 20.

The direct mass and heat transfer device 64 may also include alternative transfer medium means, such as a liquid water portion of a water saturated polyflourosulfonic ionomer membrane, and related means as described in U.S. Pat. No. 6,007,931 issued on Dec. 28, 1999 to Fuller et al., which Patent is owned by the assignee of all rights in the concentration control system 10 invention described herein, and which Patent is incorporated herein by reference.

The concentration control system 10 may also include a direct antifreeze reservoir means in fluid communication with the thermal management system for selectively supplying direct antifreeze stored within the reservoir means into the direct antifreeze solution within the thermal management system. The direct antifreeze reservoir means may include a direct antifreeze reservoir 90 for storing the direct antifreeze 92 therein; a direct antifreeze feed line 94 secured between the direct antifreeze reservoir 90 and the thermal management system for example at the accumulator 54; and a direct antifreeze supply valve 96 that selectively directs flow of the direct antifreeze from the reservoir 90 to the thermal management system. Flow of the direct antifreeze from the reservoir to the thermal management system may be by gravity, as suggested schematically by FIG. 1, or by a pump (not shown) in the event the direct antifreeze reservoir means could not be positioned to take advantage of gravity, or for other reasons, such as necessary flow rate, etc. It is pointed out, that in the remote event of the direct antifreeze reservoir means directing more direct antifreeze than can be held within the accumulator, or if the accumulator receives more direct antifreeze solution from the thermal management system through the accumulator supply line 56, the accumulator includes a over flow 98. It is also pointed out that the accumulator supply line 56 is structured to both pass direct antifreeze solution into and out of the accumulator 54.

Figure 2:
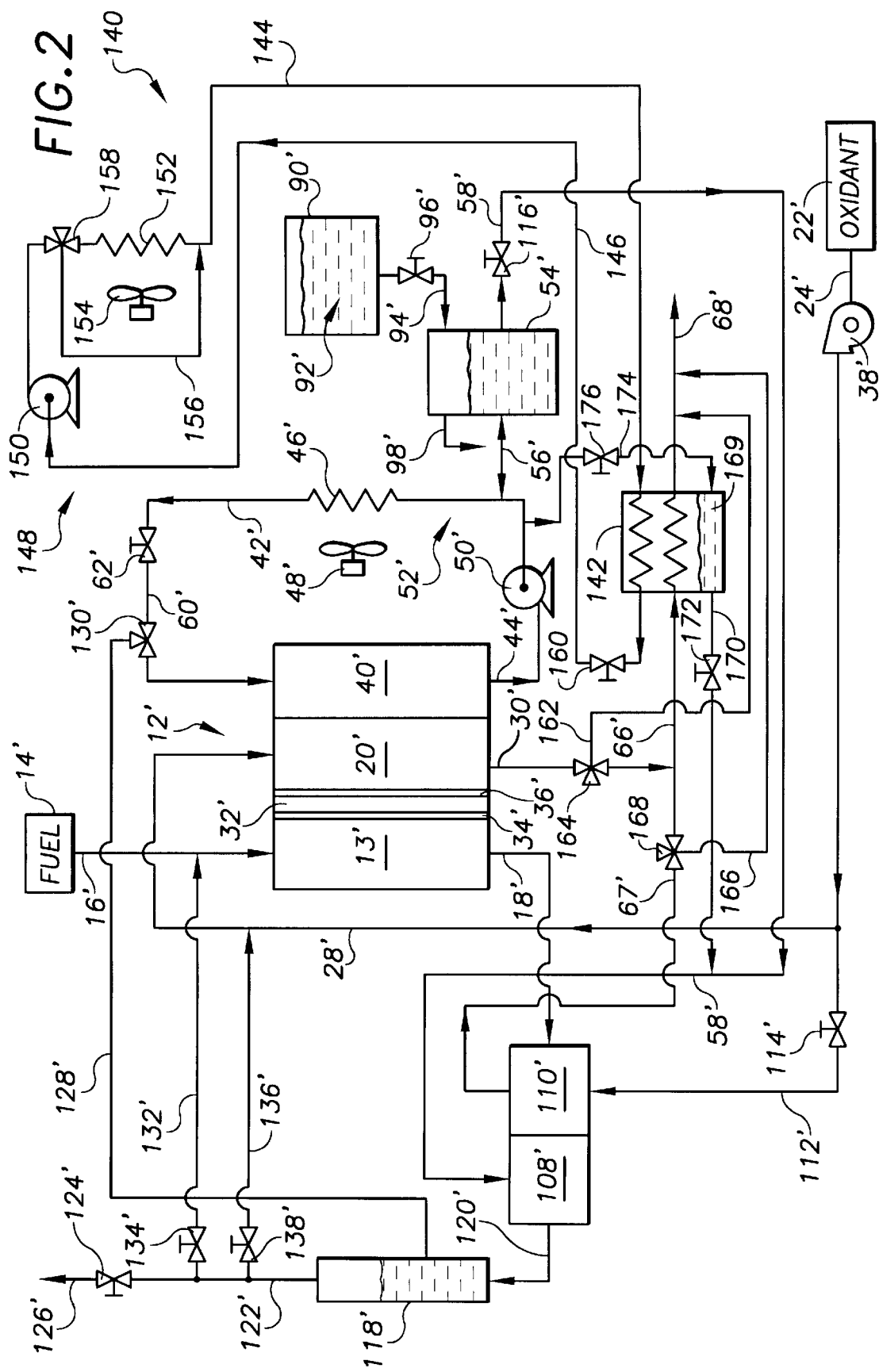
FIG. 2 is a schematic representation of a second embodiment of a direct antifreeze solution concentration control system for a fuel cell power plant constructed in accordance with the present invention, wherein the water recovery device is a condenser water recovery device.

The concentration control system 10 also includes a process exhaust by-pass line means secured in fluid communication between the fuel cell 12 and the plant exhaust vent 68 for selectively directing some or all of the process exhaust to by-pass the water recovery device. As shown in FIG. 1, the process exhaust by-pass line means may comprise a single process exhaust by-pass 100 secured to the plant exhaust line 66 and to the plant exhaust vent 68, so that the plant exhaust stream within the plant exhaust line 66 including both the cathode exhaust stream and any anode exhaust stream may by-pass the water recovery device. The process exhaust by-pass line means may also include an individual cathode and an individual anode exhaust by-pass line secured respectively to the cathode exhaust line 30 and the anode exhaust line 18 or combusted anode exhaust line 67, as shown in FIG. 2, and discussed below. The process exhaust by-pass line means also includes a by-pass control valve means for selectively controlling flow of the plant exhaust stream from the plant exhaust line 66 to the process exhaust by-pass line 100, such as a single by-pass control valve 102, which may be a standard three-way valve secured between the plant exhaust line 66 and the single process exhaust by-pass line 100.

In use of the direct antifreeze concentration control system for a fuel cell power plant 10, whenever a controller (not shown) senses that a concentration of direct antifreeze within the direct antifreeze solution is outside of a specified range, or that a water recovery rate has increase beyond a specified maximum rate, the controller controls the single by-pass control valve 102 to direct some or all of the process exhaust stream to by-pass the direct mass and heat transfer device 64, and thereby to pass directly to the plant exhaust vent 68 so that an amount of water from the process exhaust stream entering the process oxidant stream passing through the mass and heat transfer device decreases, and therefore an amount of water recovered by the plant 10 decreases. Additionally, the controller may also direct the direct antifreeze control valve 96 to send additional direct antifreeze from the direct antifreeze reservoir into 90 into the thermal management system to increase the concentration of direct antifreeze within the direct antifreeze solution within the thermal management system.

The controller means may be any controller known in the art for controlling flow through valves in response to sensed parameters. For example, a viscosity sensor may be monitored by human, mechanical or electronic means known in the art to control operation of valves, or additionally or alternatively, water recovery rate sensors may be utilized to likewise sense liquid levels, concentration and/or recovery rates of water within the direct antifreeze solution within the thermal management system. The controller may also integrate parameters not included within the power plant 10, such as ambient air temperature, calender date, and/or geographical location of the power plant as information involved in operation of the concentration control system 10, which controller capabilities are well-known in the art.

In an alternative embodiment of the direct antifreeze concentration control system for a fuel cell power plant 10, an oxidant mass transfer device by-pass line 104 may be secured between an oxidant by-pass valve 106 on the oxidant inlet 24 and the first extension 26 of the oxidant inlet, so that the controller may direct some or all of the process oxidant stream to by-pass the direct mass and heat transfer device 64, to thereby decrease moisture recovered by the power plant.

The direct antifreeze concentration control system for fuel cell power plant 10 is appropriate for usage on a power plant that utilizes pure hydrogen gas as the reducing fluid. In such a plant the process exhaust stream would consist primarily of the cathode exhaust stream because virtually all of the pure hydrogen would be utilized by the fuel cell 12. The concentration control system is also appropriate for a fuel cell power plant that utilizes a reformate, a hydrogen rich reducing fluid prepared by reforming a hydrocarbon fuel within fuel processing components, such as those described in more detail in the aforesaid, incorporated U.S. Pat. No. 6,007,931 to Fuller et al. For such a power plant, the concentration control system 10 also includes a boiler 108 in fluid communication with the thermal management system and in heat exchange relationship with a burner 110.

As shown in FIG. 1, a third extension 112 of the oxidant inlet 24 supplies through a burner oxidant supply valve 114 a portion of the oxidant stream to the burner to support combustion. The anode exhaust line 18 also supplies the anode exhaust stream to the burner 110 so that unused hydrogen is combusted in the burner, and the combusted anode exhaust stream then passes through the combusted anode exhaust line 67 to the plant exhaust line 66. The accumulator discharge line 58 selectively passes through an accumulator discharge valve 116 a portion of the direct antifreeze solution to the boiler 108 where the heat from the burner 110 boils the solution, and then directs steam and liquid direct antifreeze solution to a steam separator 118 through a steam feed line 120. A steam exhaust line 122 directs separated steam out of the steam separator 118, and a steam exhaust valve 124 selectively directs steam through a steam exhaust vent 126 out of the power plant 10. A separated direct antifreeze line 128 is secured between the steam separator 118 and the thermal management system to return separated direct antifreeze from the steam separator to the thermal management system, for example through a return valve 130 secured to the coolant loop 52 at the coolant feed line extension 60.

In an additional embodiment, the concentration control system 10 may include a steam injection means secured between the steam exhaust line 122 and the reducing fluid and process oxidant stream reactant streams entering the fuel cell 12 for selectively humidifying those streams. The steam injection means may include a single line from the steam exhaust line 122 to the oxidant inlet 24 (or first or second extensions 26, 28) thereof leading to the fuel cell 12) or the fuel inlet line 16. As shown in FIG. 1, the steam injection means may also include a reducing fluid injection line 132 and reducing fluid injection control valve 134 secured between the steam exhaust line 122 and the fuel inlet line 16 for selectively controlling a rate of injection of steam from the steam exhaust line 122 into the fuel inlet line 16, and an oxidant steam injection line 136 and oxidant injection control valve 138 secured between the steam exhaust line 122 and the second extension 28 of the oxidant inlet line 24 for controlling a rate of injection of steam into the oxidant inlet 24 entering the fuel cell 12.

In use of the concentration control system 10, if the oxidant by-pass valve 106 is actuated to direct some or all of the oxidant stream to by-pass the direct mass and heat recovery device 64 to decrease water recovery, the oxidant stream may have such a low humidity that it could dry out the electrolyte 32. The oxidant steam injection control valve 138 would be controlled to inject steam into the oxidant stream to thereby increase the humidity of the stream. If a further or alternative decrease in water recovery is required, the accumulator discharge valve 116 sends some of the direct antifreeze solution from the accumulator 54 to the boiler 108 through the accumulator discharge line 58 so that excess water is boiled to steam, and directed out of the power plant through the steam exhaust vent 126. The direct antifreeze remaining in the steam separator 118 may then be transferred back to the thermal management system through the separated direct antifreeze line 128 to increase the concentration of the direct antifreeze within the direct antifreeze solution without having to use the direct antifreeze from the direct antifreeze reservoir 90.

A second embodiment 140 of the concentration control system for a fuel cell power plant is shown schematically in FIG. 2, and includes many components that are virtually identical to components shown in FIG. 1 and described above. The virtually identical components in FIG. 2 are designated in FIG. 2 and herein as primes of the reference numeral utilized for the same or similar component in FIG. 1 for efficiency. For example, in FIG. 1, the anode flow field is designated by the reference numeral 13, and in FIG. 2, an anode flow field of the second embodiment of the concentration control system 140 is designated by the reference numeral 13'.

The second embodiment of the direct antifreeze concentration control system for a fuel cell power plant 140 differs from the FIG. 1 embodiment in particular by having a condenser water recovery device 142. The condenser water recovery device 142 is secured in fluid communication with the process exhaust stream within the plant exhaust line 66' and with a cooling fluid so that the condenser 142 directs the process exhaust stream to pass in heat exchange relationship within the condenser with the cooling fluid. Any cooling fluid may be used to produce condensation of water within the process exhaust stream, such as ambient air or the direct antifreeze solution.

Alternatively, a condenser cooling fluid may be directed to circulate into the condenser 142 from a condenser cooling fluid feed line 144, and out of the condenser 142 through a condenser cooling fluid return line 146. The condenser cooling fluid may also cycle through a condenser cooling fluid loop 148, including a condenser cooling fluid pump 150 positioned between the condensing cooling fluid feed and return lines 144, 146; a heat rejection apparatus 152 secured to the feed line 144, such as a heat exchanger having a condenser cooling fluid heat rejection fan 154; a heat rejection by-pass means for selectively by-passing the heat rejection apparatus, having a heat rejection by-pass line 156 secured to two points on the condenser cooling fluid feed line 144 and a heat rejection by-pass valve 158 secured between the feed line 144 and by-pass line 156 for controlling the condenser cooling fluid within the by-pass line 156 to selectively by-pass the heat rejection apparatus 152; and a condenser cooling fluid flow control valve 160 secured to the return line 146 for controlling flow of the condenser cooling fluid through the condenser 142. The condenser cooling fluid within the condenser cooling fluid loop 148 is isolated from the direct antifreeze solution, and from the thermal management system. Therefore, there is no risk of the condenser cooling fluid contacting and poisoning the anode and/or the cathode catalysts 34', 36 '. Consequently, the condenser cooling fluid within the condenser cooling fluid loop 146 may be a conventional antifreeze solution.

The condenser heat rejection apparatus 152 and condenser cooling fluid flow control valve 160 may also be used to control a concentration of direct antifreeze within the fuel cell power plant 140. If the controller senses a decrease in the concentration of direct antifreeze in the direct antifreeze solution below a specified minimum level, or senses and increase in water recovery above a maximum rate, the heat rejection by-pass valve 158 may be controlled to direct some or all of the condenser cooling fluid to by-pass the heat rejection apparatus 152 through the heat rejection by-pass line 156, or alternatively, the heat rejection fan 154 may be slowed, or shut down, so that a temperature of the condenser cooling fluid flowing through the condenser cooling fluid feed line 144 to the condenser 142 increases. That increase in temperature in turn decreases a rate of condensation and recovery of water from the process exhaust stream passing through the condenser 142. Alternatively, the condenser cooling fluid flow control valve 160 may be controlled to slow or stop flow of the condenser cooling fluid through the condenser 142, thereby increasing the temperature of the condenser cooling fluid within the condenser 142 to decrease a rate of condensation and hence water recovery by the condenser 142.

The second embodiment 140 of the direct antifreeze concentration control system for a fuel cell power plant also shows an alternative embodiment of the process exhaust by-pass line means that is appropriate for usage on any embodiment of the concentration control system 10. As shown in FIG. 2, the process exhaust by-pass line means may include a cathode process exhaust by-pass line 162 secured between the cathode exhaust line 30' and the plant exhaust vent 68', including a cathode exhaust by-pass control valve 164, which may be a standard three way valve for controlling flow of some or all of the cathode exhaust stream to by-pass as the process exhaust stream the water recovery device and exit the plant through the plant exhaust vent 68', wherein the water recovery device may be either the condenser 142 of FIG. 2 or the direct mass and heat transfer device 64 of FIG. 1.

Similarly, the process exhaust by-pass line means may also include an anode process exhaust by-pass line 166 secured between the anode exhaust line directly, or between the combusted anode exhaust line 67' and the plant exhaust vent 68', as shown in FIG. 2, including an anode exhaust by-pass control valve 168, which may be a standard three way valve for controlling flow of some or all of the combusted anode exhaust stream to by-pass as the process exhaust stream the water recovery device to exit the plant through the plant exhaust vent 68', thereby reducing the amount of water that can be condensed from the process exhaust stream. If necessary to rapidly decrease a rate of water recovery by the water recovery device, all or both the cathode and anode exhaust streams can be quickly diverted to by-pass the water recovery devices, 64, 142.

In the second embodiment 140 of the direct antifreeze concentration control system for a fuel cell power plant shown in FIG. 2, the water 169 condensed out of the process exhaust stream by the condenser may be returned to the power plant for a variety of usages. For example, a condenser discharge line 170 having secured thereto a condenser discharge control valve 172 may direct the condensed water from the condenser 142 to the boiler 108' directly, or by intersection with the accumulator discharge line 58' so that the water may be boiled, and vented from 35 the plant through the steam exhaust valve 124 and vent 126, as described above. In such a manner, excess recovered water may be vented from the plant while direct antifreeze may be separated in the steam separator 118' from the direct antifreeze solution delivered from the accumulator 54' and hence through the accumulator supply line 56' from the thermal management system in order to increase a concentration of direct antifreeze in the direct antifreeze solution. The direct antifreeze separated from the steam in the steam separator may then be sent to the coolant loop 52' of the thermal management system through the separated direct antifreeze line 128', to increase a concentration of the direct antifreeze in the direct antifreeze solution within the thermal management system without need of transferring direct antifreeze from the direct antifreeze reservoir 90'. A condenser supply line 174 including a condenser supply control valve 176 may also be secured between the thermal management system such as between the coolant feed line 42' and the condenser 142 as shown in FIG. 2, to selectively supply direct antifreeze solution or a standard antifreeze solution to any condenser water 169 in the condenser to prevent freezing of the water 169.

The second embodiment of the direct antifreeze concentration control system 140 also provides for application of the control system to a closed thermal management system means for controlling a temperature within the fuel cell means 12', that simply directs a standard antifreeze solution or a direct antifreeze solution to pass in heat exchange relationship with the fuel cell means 12', such as through a sealed coolant 30 plate, and wherein no porous water transport plate 40' is included. For convenience, when referring to application of the second embodiment of the direct antifreeze concentration control system 140 to either a standard antifreeze solution or a direct antifreeze solution, both the standard and direct antifreeze solutions are hereinafter meant to be included in the phrase "antifreeze solution" when the phrase is not preceded by either the word "standard" or the word "direct". In such an application, the water 169 in the condenser 142 includes a proportion of antifreeze directed from the thermal management system through the condenser supply line 174, and the condensed water is therefore an antifreeze solution. The antifreeze solution then passes from the condenser 142 through the condenser discharge line 170 and is returned to the coolant inlet line 142', or is directed to the boiler 108' and steam separator 118'. From the steam separator, most water is vented out of the plant through the steam exhaust vent 126', while some water and antifreeze return to the closed thermal management system through the separated antifreeze line 128'. If the rate of water recovery by the condenser 142 increases, an increased amount of water would be directed back through the separated antifreeze line 128' to dilute the antifreeze solution in the thermal management system. By controlling the cathode and/or the anode exhaust by-pass control valves 164, 168 to direct some of the process exhaust stream to by-pass the condenser 142, the amount of water in the separated antifreeze line 128' is decreased, thereby controlling the concentration of antifreeze in the antifreeze solution within the closed thermal management system.

It is pointed out that in some embodiments of the direct antifreeze concentration control system for a fuel cell power plant 10 of the present invention, the direct antifreeze reservoir 90, 90' may be utilized to supply direct antifreeze into the direct antifreeze solution within the fuel cell power plant whenever a concentration of direct antifreeze in the solution descends below a minimum level. However, for some embodiments, the concentration control system 10 will be able to detect and correct increases in water recovery so quickly, that no significant dilution of the direct antifreeze in the solution will occur. Small losses of direct antifreeze solution through the plant exhaust vent 68, 68' and/or the steam exhaust vent 126, 126' are inevitable. Because of the favorable characteristics of the direct, special direct, and alkanetriol direct antifreeze solutions, however, such losses are minimized. Therefore, for certain applications of the direct antifreeze concentration control system for a fuel cell power plant 10, such as in a vehicle exposed to sub-freezing temperatures for limited annual time periods, the direct antifreeze concentration may be increased by a human controller simply adding some direct antifreeze on an annual basis. Therefore, in such embodiments of the concentration control system 10, no separate direct antifreeze reservoir 90, 90' is necessary. In alternative embodiments, such as those having no boiler 108, steam separator 118, and steam exhaust vent 126', those having fewer components to decrease water recovery, or those operating in sub-freezing conditions for extended periods, a separate direct antifreeze reservoir 90, 90' would be necessary. The direct antifreeze reservoir 90, 90' and other components of the concentration control system for a fuel cell power plant are constructed of materials well known in the fuel cell art and the heat exchanger art.

While the present invention has been described and illustrated with respect to a particular construction of a direct antifreeze solution concentration control system for a fuel cell power plant 10, it is to be understood that the concentration control system is not to be limited to the described and illustrated embodiments. For example, while the fuel cell 12 described above utilizes a PEM electrolyte, the fuel cell 12 may use alternative electrolytes known in the art. Additionally, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. A direct antifreeze solution concentration control system for a fuel cell power plant for controlling a concentration of a direct antifreeze in a direct antifreeze solution within the plant, the concentration control system comprising:

a. at least one fuel cell means for generating electricity from reducing fluid and process oxidant reactant streams having an electrolyte secured between an anode and a cathode catalyst;

b. a thermal management system that controls a temperature within the fuel cell means including a porous water transport plate secured in direct fluid communication with the cathode catalyst wherein the direct antifreeze solution passes through the porous water transport plate and the direct antifreeze solution is an organic antifreeze solution that is non-volatile at fuel cell operating temperatures;

c. water recovery device means secured in fluid communication with a process exhaust stream exiting the fuel cell means within a plant exhaust line for recovering water from the process exhaust stream; and, d. a process exhaust by-pass line means secured in fluid communication between the plant exhaust line and a plant exhaust vent including a process exhaust by-pass control valve for selectively directing some or all of the process exhaust stream to by-pass the water recovery device through the process exhaust by-pass line means and to vent from the plant through the plant exhaust vent.

2. The direct antifreeze solution concentration control system of claim 1, wherein the water recovery device means comprises a direct mass and heat transfer device secured in fluid communication with both an oxidant inlet that directs the process oxidant stream into the fuel cell means and with the plant exhaust line so that the process oxidant stream passes through an oxidant chamber of the device adjacent an inlet surface of a mass transfer medium means and the process exhaust stream passes through an exhaust chamber of the device adjacent an outlet surface of the device, the mass transfer medium means being for sorbing a fluid substance consisting of polar molecules within the process exhaust stream and for desorbing the fluid substance consisting of polar molecules into the process oxidant stream.

3. The direct antifreeze solution concentration control system of claim 2, further comprising an oxidant mass transfer device by-pass line secured between the oxidant inlet upstream of the direct mass and heat transfer device and an oxidant inlet extension downstream of the direct mass and heat transfer device including an oxidant by-pass valve for selectively directing some or all of the process oxidant stream to by-pass the device.

4. The direct antifreeze solution concentration control system of claim 1, wherein the water recovery device means comprises a condenser secured in fluid communication with the plant exhaust line directing the process exhaust stream out of the fuel cell and with a cooling fluid so that the condenser directs the process exhaust stream to pass in heat exchange relationship with the cooling fluid to condense water out of the plant exhaust stream.

5. The direct antifreeze solution concentration control system of claim 4, further comprising a condenser cooling fluid loop in fluid communication with the condenser for cycling a condenser cooling fluid through the condenser, including a heat rejection apparatus secured to a feed line of the loop for cooling the condenser cooling fluid passing through the heat rejection apparatus; a heat rejection by-pass means for selectively by-passing the heat rejection apparatus having a by-pass line secured to two points upstream and downstream of the heat rejection apparatus on the feed line, and a heat rejection by-pass control valve for controlling the condenser cooling fluid to selectively by-pass within the heat rejection by-pass line the heat rejection apparatus; a condenser cooling fluid pump secured in fluid communication with the feed line for pumping the condenser cooling fluid through the condenser coolant loop; and, a condenser cooling fluid flow control valve secured to the condenser coolant loop for selectively controlling flow of the condenser coolant fluid through the condenser.

6. The direct antifreeze solution concentration control system of claim 1, further comprising a burner in fluid communication with an anode exhaust stream exiting the fuel cell within an anode exhaust passage; a boiler in heat exchange relationship with the burner that receives direct antifreeze solution from a discharge line in fluid communication between the boiler and the thermal management system; a steam separator in fluid communication with the boiler that receives and separates steam and liquid direct antifreeze from the boiler; a steam exhaust valve and steam exhaust vent in fluid communication with the steam separator that selectively direct steam through the steam exhaust vent out of the power plant.

7. The direct antifreeze solution concentration control system of claim 6, further comprising a steam injection means secured in fluid communication through a steam injection line between the steam separator and the reactant streams entering the fuel cell, including an injection control valve for selectively controlling injection of steam from the steam separator into the reactant streams.

8. The direct antifreeze solution concentration control system of claim 7, wherein the system further comprises a separated direct antifreeze line secured between the steam separator and the thermal management system, including a separated direct antifreeze return valve for selectively controlling flow of direct antifreeze from the steam separator to the thermal management system.

9. The direct antifreeze solution concentration control system of claim 1, wherein the antifreeze solution is an alkanetriol direct antifreeze solution selected from the group consisting of a glycerol solution, a butanetriol solution, and a pentanetriol solution.

10. A direct antifreeze solution concentration control system for a fuel cell power plant for controlling a concentration of a direct antifreeze in a direct antifreeze solution within the plant, the concentration control system comprising:
   a. at least one fuel cell means for generating electricity from reducing fluid and process oxidant reactant streams having an electrolyte secured between an anode and a cathode catalyst;
   b. a thermal management system that controls a temperature within the fuel cell means including a porous water transport plate secured in direct fluid communication with the cathode catalyst wherein the direct antifreeze solution passes through the porous water transport plate and the direct antifreeze solution is an organic antifreeze solution that is non-volatile at fuel cell operating temperatures;
   c. pressure control means in fluid communication with the porous water transport plate for maintaining a positive pressure differential between the process oxidant stream passing through the fuel cell adjacent the cathode catalyst and the direct antifreeze solution passing through the water transport plate so that the process oxidant stream within the fuel cell is at a greater pressure than the direct antifreeze solution within the transport plate;
   d. water recovery device means secured in fluid communication with a process exhaust stream exiting the fuel cell means within a plant exhaust line for recovering water from the process exhaust stream;
   e. a direct antifreeze reservoir means in fluid communication with the thermal management system for selectively supplying direct antifreeze stored within the reservoir means into the direct antifreeze solution in the thermal management system; and,
   f. a process exhaust by-pass line means secured in fluid communication between the plant exhaust line and a plant exhaust vent including a process exhaust by-pass control valve for selectively directing some or all of the process exhaust stream to by-pass the water recovery device through the process exhaust by-pass line means and to pass out of the plant through the plant exhaust vent.

11. The direct antifreeze solution concentration control system of claim 10, wherein the water recovery device means comprises a direct mass and heat transfer device secured in fluid communication with both an oxidant inlet that directs the process oxidant stream into the fuel cell means and with the plant exhaust line so that the process oxidant stream passes through an oxidant chamber of the device adjacent an inlet surface of an enthalpy exchange barrier mass transfer medium and the process exhaust stream passes through an exhaust chamber of the device adjacent an outlet surface of the device.

12. The direct antifreeze solution concentration control system of claim 11, wherein the direct mass and heat transfer device includes a liquid transfer medium supply means for supplying a portion of the direct antifreeze solution to the enthalpy exchange barrier mass transfer medium.

13. The direct antifreeze solution concentration control system of claim 10, wherein the water recovery device means comprises a condenser secured in fluid communication with the plant exhaust line directing the process exhaust stream out of the fuel cell and with a cooling fluid so that the condenser directs the process exhaust stream to pass in heat exchange relationship with the cooling fluid to condense water out of the plant exhaust stream.

14. The direct antifreeze solution concentration control system of claim 10, further comprising a burner in fluid communication with an anode exhaust stream exiting the fuel cell within an anode exhaust passage; a boiler in heat exchange relationship with the burner that receives direct antifreeze solution from a discharge line in fluid communication between the boiler and the thermal management system; a steam separator in fluid communication with the boiler that receives and separates steam and liquid direct antifreeze from the boiler; a steam exhaust valve and steam exhaust vent in fluid communication with the steam separator that selectively direct steam through the steam exhaust vent out of the power plant; a steam injection means secured in fluid communication through a steam injection line between the steam separator and the reactant streams entering the fuel cell, including an injection control valve for selectively controlling injection of steam from the steam separator into the reactant streams; the system also comprising a separated direct antifreeze line secured between the steam separator and the thermal management system, including a separated direct antifreeze return valve for selectively controlling flow of direct antifreeze from the steam separator to the thermal management system.

15. The direct antifreeze solution concentration control system of claim 14, wherein the antifreeze solution is an alkanetriol direct antifreeze solution selected from the group consisting of a glycerol solution, a butanetriol solution, and a pentanetriol solution.

16. A direct antifreeze solution concentration control system for a fuel cell power plant for controlling a concentration of a direct antifreeze in a direct antifreeze solution within the plant, the concentration control system comprising:
   a. at least one fuel cell means for generating electricity from reducing fluid and process oxidant reactant streams having an electrolyte secured between an anode and a cathode catalyst;
   b. a thermal management system that controls a temperature within the fuel cell means including a porous water transport plate secured in direct fluid communication with the cathode catalyst wherein the direct antifreeze solution passes through the porous water transport plate and the direct antifreeze solution is an organic antifreeze solution that is non-volatile at fuel cell operating temperatures;

c. water recovery device means secured in fluid communication with a process exhaust stream exiting the fuel cell means within a plant exhaust line for recovering water from the process exhaust stream; and, d. a burner in fluid communication with an anode exhaust stream exiting the fuel cell within an anode exhaust passage; a boiler in heat exchange relationship with the burner that receives direct antifreeze solution from a discharge line in fluid communication between the boiler and the thermal management system; a steam separator in fluid communication with the boiler that receives and separates steam and liquid direct antifreeze from the boiler; a steam exhaust valve and steam exhaust vent in fluid communication with the steam separator that selectively direct steam through the steam exhaust vent out of the power plant.

17. The direct antifreeze solution concentration control system of claim 16, further comprising a steam injection means secured in fluid communication through a steam injection line between the steam separator and the reactant streams entering the fuel cell, including an injection control valve for selectively controlling injection of steam from the steam separator into the reactant streams; the system also comprising a separated direct antifreeze line secured between the steam separator and the thermal management system, including a separated direct antifreeze return valve for selectively controlling flow of direct antifreeze from the steam separator to the thermal management system.

18. The direct antifreeze solution concentration control system of claim 16, further comprising pressure control means in fluid communication with the porous water transport plate for maintaining a positive pressure differential between the process oxidant stream passing through the fuel cell adjacent the cathode catalyst and the direct antifreeze solution passing through the water transport plate so that the process oxidant stream within the fuel cell is at a greater pressure than the direct antifreeze solution within the water transport plate.

19. The direct antifreeze solution concentration control system of claim 16, wherein the antifreeze solution is an alkanetriol direct antifreeze solution selected from the group consisting of a glycerol solution, a butanetriol solution, and a pentanetriol solution.

20. A direct antifreeze solution concentration control system for a fuel cell power plant for controlling a concentration of antifreeze in an antifreeze solution within the plant, the concentration control system comprising:

a. at least one fuel cell means for generating electricity from reducing fluid and process oxidant reactant streams having an electrolyte secured between an anode and a cathode catalyst;

b. a closed thermal management system means for controlling a temperature within the fuel cell means that directs the antifreeze solution to pass in heat exchange relationship with the fuel cell means;

c. a condenser secured in fluid communication with a plant exhaust line directing a process exhaust stream out of the fuel cell means to condense water out of the process exhaust stream, including a condenser supply line secured in fluid communication between the condenser and the closed thermal management system to supply the antifreeze solution to the water in the condenser, and including a condenser discharge line secured in fluid communication between the condenser and the closed thermal management system to selectively direct the antifreeze solution from the condenser to the closed thermal management system; and, d. a process exhaust by-pass line means secured in fluid communication between the plant exhaust line and a plant exhaust vent including a process exhaust by-pass control valve for selectively directing some or all of the process exhaust stream to by-pass the condenser through the process exhaust by-pass line means and to vent out of the plant through the plant exhaust vent.

21. The direct antifreeze solution concentration control system of claim 20, further comprising a boiler in fluid communication with the condenser that receives the condensed water and antifreeze solution through the condenser discharge line secured between the condenser and the boiler, a steam separator in fluid communication with the boiler that receives and separates steam and liquid water and antifreeze solution from the boiler, a steam exhaust valve and steam exhaust vent in fluid communication with the separator that selectively vents steam through the steam exhaust vent out of the power plant, and a separated antifreeze line secured between the steam separator and the closed thermal management system, including a separated direct antifreeze return valve for selectively controlling flow of separated liquid water and antifreeze solution from the steam separator to the closed thermal management system.

22. The direct antifreeze solution concentration control system of claim 20, wherein the process exhaust by-pass line means includes a cathode process exhaust by-pass line and cathode exhaust by-pass control valve secured in fluid communication between the cathode catalyst of the fuel cell means and the plant exhaust vent.

23. The direct antifreeze solution concentration control system of claim 22, wherein the process exhaust by-pass line means includes an anode process exhaust by-pass line and anode exhaust by-pass control valve secured in fluid communication between the anode catalyst of the fuel cell means and the plant exhaust valve.

24. The direct antifreeze solution concentration control system of claim 20, further comprising a condenser cooling fluid loop in fluid communication with the condenser for cycling a condenser cooling fluid through the condenser, including a heat rejection apparatus secured to a feed line of the loop for cooling the condenser cooling fluid passing through the heat rejection apparatus; a heat rejection by-pass means for selectively by-passing the heat rejection apparatus having a by-pass line secured to two points upstream and downstream of the heat rejection apparatus on the feed line, and a heat rejection by-pass control valve for controlling the condenser cooling fluid to selectively by-pass within the heat rejection by-pass line the heat rejection apparatus; a condenser cooling fluid pump secured in fluid communication with the feed line for pumping the condenser cooling fluid through the condenser coolant loop; and, a condenser cooling fluid flow control valve secured to the condenser coolant loop for selectively controlling flow of the condenser coolant fluid through the condenser.

* * * * *